(12) United States Patent
Lee et al.

(10) Patent No.: US 12,262,307 B2
(45) Date of Patent: Mar. 25, 2025

(54) METHOD AND APPARATUS FOR SESSION MANAGEMENT IN WIRELESS COMMUNICATION SYSTEM

(71) Applicant: Samsung Electronics Co., Ltd., Gyeonggi-do (KR)

(72) Inventors: Hoyeon Lee, Gyeonggi-do (KR); Sangsoo Jeong, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 417 days.

(21) Appl. No.: 17/705,608

(22) Filed: Mar. 28, 2022

(65) Prior Publication Data
US 2022/0312305 A1    Sep. 29, 2022

(30) Foreign Application Priority Data

Mar. 29, 2021  (KR) .................... 10-2021-0040606
Apr. 9, 2021   (KR) .................... 10-2021-0046630

(51) Int. Cl.
*H04W 48/00*    (2009.01)
*H04L 5/00*     (2006.01)
(Continued)

(52) U.S. Cl.
CPC .......... *H04W 48/16* (2013.01); *H04L 5/0046* (2013.01); *H04L 5/0053* (2013.01); *H04L 5/0098* (2013.01); *H04W 28/06* (2013.01)

(58) Field of Classification Search
None
See application file for complete search history.

(56) References Cited

U.S. PATENT DOCUMENTS

2019/0253917 A1*  8/2019  Dao .............. H04W 28/0268
2019/0261260 A1*  8/2019  Dao .................... H04W 48/00
(Continued)

FOREIGN PATENT DOCUMENTS

| EP | 3 761 586 | 1/2021 | |
| KR | 10-2021-0144205 | 11/2021 | |
| WO | WO-2022035230 A1 * | 2/2022 | ............ H04W 24/02 |

OTHER PUBLICATIONS

Nec, Apple, "Network Slice Quota Control Function (NSQCF) Services Definition", S2-21XXXXX, 3GPP TSG-SA WG2 Meeting #143E e-meeting, Feb. 24-Mar. 9, 2021, 4 pages.
(Continued)

*Primary Examiner* — Gerald A Smarth
(74) *Attorney, Agent, or Firm* — The Farrell Law Firm, P.C.

(57) ABSTRACT

The disclosure relates to a communication method and system for converging a 5G communication system for supporting higher data rates beyond a 4G system with a technology for IoT. The disclosure may be applied to intelligent services based on the 5G communication technology and the IoT-related technology such as smart homes, smart buildings, smart cities, smart cars, connected cars, health care, digital education, smart retail, and security and safety services. A method performed by an SMF includes determining to update network slice availability; transmitting, to an NSACF, a network slice availability update request message including a UE ID and a PDU session ID; and receiving, from the NSACF, a network slice availability update response message including a result indication. The result indication is associated with updating a number of PDU sessions per network slice based on the UE ID and the PDU session ID.

20 Claims, 9 Drawing Sheets

(51) Int. Cl.
    *H04W 28/06*    (2009.01)
    *H04W 48/16*    (2009.01)

(56) References Cited

U.S. PATENT DOCUMENTS

2020/0412559 A1    12/2020  Tang
2024/0064863 A1*    2/2024  Dauneria .............. H04W 76/32

OTHER PUBLICATIONS

Huawei, HiSilicon, "Network Slice Access Control Functionalities and Services", S2-210xxxx, 3GPP TSG-WG SA2 Meeting #143E e-meeting, Feb. 24-Mar. 9, 2021, 5 pages.
Huawei et al., "Architectural Support of Network Slice Access Control Functionalities", S2-210xxxx, 3GPP TSG-WG SA2 Meeting #143E e-meeting, Feb. 24-Mar. 9, 2021, 4 pgs.
Nec et al., "TS23.501 KW#1 Network Slice Admission Control Function (NSACF) Definition", S2-2101605, 3GPP TSG-SA WG2 Meeting #143E e-meeting, Feb. 24-Mar. 9, 2021, 15pg.
3GPP, 3rd Generation Partnership Project; Technical Specification Group Services and System Aspects; Procedures for the 5G System (5GS); Stage 2, (Release 17), 3GPP TS 23.502 V17.2.0, Sep. 2021, 713 pages.
International Search Report dated Jun. 16, 2022 issued in counterpart application No. PCT/KR2022/004348, 8 pages.
3GPP TR 23.700-40 V2.0.0, (Mar. 2021), 226 pp.
Nec et al., "TS23.502 KI#2 Network Slice Admission Control Function (NSACF) Services and Procedures", S2-2100980, 3GPP TSG-SA WG2 Meeting #143E e-meeting, Feb. 24-Mar. 9, 2021, 4 pages.
European Search Report dated Jul. 5, 2024 issued in counterpart application No. 22781543.8-1215, 13 pages.

* cited by examiner

METHOD AND APPARATUS FOR SESSION MANAGEMENT IN WIRELESS COMMUNICATION SYSTEM

CROSS-REFERENCE TO RELATED APPLICATION(S)

This application is based on and claims priority under 35 U.S.C. § 119 to Korean Patent Application Nos. 10-2021-0040606 and 10-2021-0046630, which were filed in the Korean Intellectual Property Office on Mar. 29, 2021 and Apr. 9, 2021, respectively, the entire disclosure of each of which is incorporated herein by reference.

1. FIELD

The disclosure relates generally to a wireless communication system and, more specifically, to an apparatus and a method for providing network slicing in a wireless communication system or a mobile communication system.

2. DESCRIPTION OF RELATED ART

To meet the increasing demand for wireless data traffic since deployment of $4^{th}$ generation (4G) communication systems, efforts have been made to develop an improved. $5^{th}$ generation (5G) or pre-5G communication system. The 5G or pre-5G communication system may also be referred to as a 'beyond 4G network' or a 'post long term evolution (LTE) system'. The 5G communication system is intended to be implemented in higher frequency (mm Wave) bands, e.g., 60 GHz bands, to accomplish higher data rates.

To decrease propagation loss of the radio waves and increase the transmission distance, the beamforming, massive multiple-input multiple-output (MIMO), full dimensional MIMO (FD-MIMO), array antennas, analog beam forming, and large scale antenna techniques are being discussed in 5G communication systems. In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation, etc. In the 5G system, hybrid frequency shift keying (FSK) and quadrature amplitude modulation (QAM) (FOAM) and sliding window superposition coding (SWSC) have been developed for advanced coding modulation (ACM), and filter bank multi carrier (FBMC), non-orthogonal multiple access (NOMA), and sparse code multiple access (SCMA) have been developed as advanced access technologies.

The Internet is now evolving to the Internet of Things (IoT) where distributed entities, i.e., things, exchange and process information without human intervention. The Internet of Everything (IoE) has also emerged, which is a combination of the IoT technology and the Big Data processing technology through connection with a cloud server. As technology elements, such as "sensing technology", "wired/wireless communication and network infrastructure", "service interface technology", and "Security technology" have been demanded for IoT implementation, a sensor network, a machine-to-machine (M2M) communication, machine type communication (MTC), etc., have been recently researched.

IoT environment may provide intelligent Internet technology services that collect and analyze data generated among connected things. IoT may be applied to a variety of fields including smart homes, smart buildings, smart cities, smart or connected cars, smart grids, health care, smart appliances, and advanced medical services through convergence and combination between existing information technology (IT) and various industrial applications.

In line with this, various attempts have been made to apply 5G communication systems to IoT networks. For example, technologies such as a sensor network, MTC, and M2M communication may be implemented by beamforming, MIMO, and array antennas. Application of a cloud radio access network (RAN) as the above-described Big Data processing technology may also be considered to be as an example of convergence between the 5G and IoT technologies.

SUMMARY

An aspect of the disclosure is to provide to a method for providing network slicing information in a wireless communication system or a mobile communication system.

In accordance with an aspect of the disclosure, a method performed by a session management function (SMF) in a wireless communication system is provided. The method includes determining to update network slice availability; transmitting, to a network slice admission control function (NSACF), a network slice availability update request message including a user equipment (UE) identifier (ID) and a protocol data unit (PDU) session ID; and receiving, from the NSACF, a network slice availability update response message including a result indication. The result indication is associated with updating a number of PDU sessions per network slice based on the UE ID and the PDU session ID.

In accordance with another aspect of the disclosure, a method performed by a network slice admission control function (NSACF) in a wireless communication system is provided. The method includes receiving, from a session management function (SMF), a network slice availability update request message including a user equipment (UE) identifier (ID) and a protocol data unit (PDU) session ID; updating a number of PDU sessions per network slice based on the UE ID and the PDU session ID; and transmitting, to the SMF, a network slice availability update response message including a result indication associated with the updating. Whether to update network slice availability is determined by the SMF.

In accordance with another aspect of the disclosure, a session management function (SMF) is provided, which includes a transceiver, and a controller configured to determine to update network slice availability, transmit, to a network slice admission control function (NSACF), via the transceiver, a network slice availability update request message including a user equipment (UE) identifier (ID) and a protocol data unit (PDU) session ID, and receive, from the NSACF, via the transceiver, a network slice availability update response message including a result indication. The result indication is associated with updating a number of PDU sessions per network slice based on the UE ID and the PDU session ID.

In accordance with another aspect of the disclosure, a network slice admission control function (NSACF) is provided, which includes a transceiver, and a controller configured to: receive, from a session management function (SMF), via the transceiver, a network slice availability update request message including a user equipment WE) identifier (ID) and a protocol data unit (PDU) session ID, update a number of PDU sessions per network slice based on the UE ID and the PDU session ID, and transmit, to the SMF, via the transceiver, a network slice availability update response message including a result indication associated with the updating. Whether to update network slice availability is determined by the SMF.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Hereinafter, various embodiments of the disclosure will be described in detail in conjunction with the accompanying drawings. In the following description of the disclosure, a detailed description of known functions or configurations incorporated herein will be omitted when it is determined that the description may obscure the subject matter of the disclosure. The terms which will be described below are defined in consideration of the functions in the disclosure, and may be different according to users, intentions of the users, or customs. Therefore, the definitions of the terms should be made based on the contents throughout the specification.

Advantages and features of the disclosure and ways to achieve them will be apparent by making reference to embodiments as described below in detail in conjunction with the accompanying drawings. However, the disclosure is not limited to the embodiments set forth below, but may be implemented in various different forms. The following embodiments are provided only to completely disclose the disclosure and inform those skilled in the art of the scope of the disclosure, and the disclosure is defined only by the scope of the appended claims.

Throughout the specification, the same or like reference numerals designate the same or like elements.

The disclosure provides an apparatus and a method for providing network slice (or network slicing) in a wireless communication system. Specifically, through the disclosure, a description will be made of a technology of managing network slice information in a wireless communication system for providing a network slice function. Furthermore, a technology for interworking between a wireless communication system and a terminal will be described.

In the following description, terms referring to signals, terms referring to control information, terms referring to network entities, terms referring to device elements, and the like are illustratively used for the sake of convenience. Therefore, the disclosure is not limited by the terms as used below, and other terms referring to subjects having equivalent technical meanings may be used.

Further, in the following description, various embodiments of the disclosure will be described using terms and names defined in some communication standards (e.g., 3rd generation partnership project (3GPP)) standards for the sake of illustration. However, various embodiments of the disclosure may be applied to other communication systems through modifications.

In 3GPP standards, a 5G network system architecture and procedure is standardized. A mobile communication provider may provide various services in a 5G network. In order to provide each service, the mobile communication provider should satisfy different service requirements (e.g., latency communication coverage, data rate, bandwidth, reliability, etc.) according to services. To this end, the mobile communication provider may configure a network slice, and may allocate network resources suitable for a specific service for each network slice or each set of network slices. The network resources may imply a network function (NF), a logical resource provided by the NF, and/or a wireless resource allocated by a base station.

For example, the mobile communication provider may configure a network slice A in order to provide a mobile broadband service, may configure a network slice B in order to provide a vehicle communication service, and may configure a network slice C in order to provide an IoT service. That is, in a 5G network, a pertinent service may be efficiently provided to a terminal through a network slice specialized to correspond to the characteristics of each service.

Figure 1:
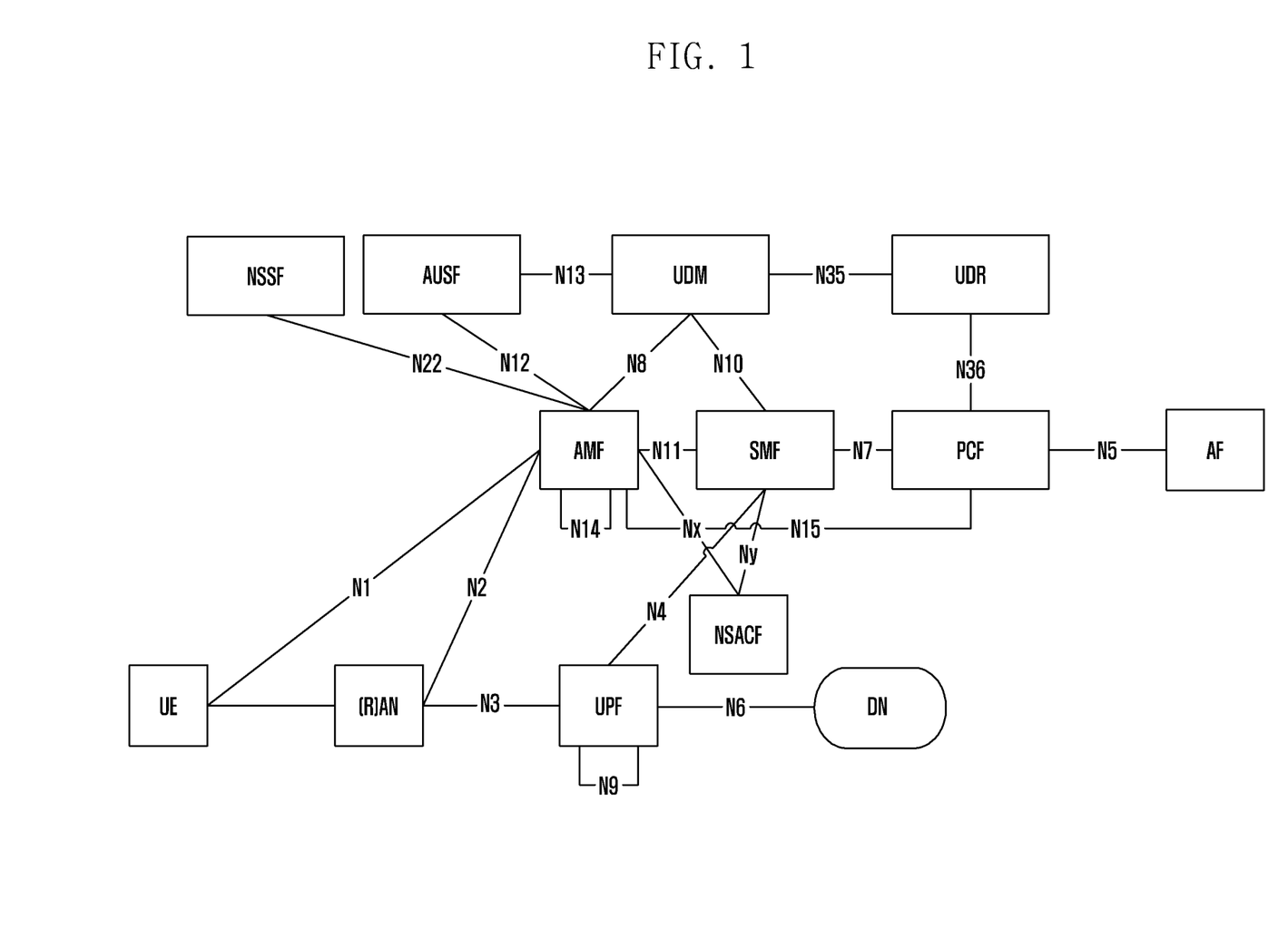
FIG. 1 illustrates a mobile communication system according to an embodiment.

FIG. 1 illustrates a mobile communication system according to an embodiment.

Referring to FIG. 1, a 5G system includes a terminal (e.g., a UE), a base station (e.g., a (R)AN), and a 5G core network (5GC).

The 5G core network also includes an access and mobility management function (AMF), a session management function (SMF), a user plane function (UPF), a policy control function (PCP), unified data management (UDM), a network slice selection function (NSSF), a network slice admission control function (NSACF), an authentication server function (AUSF), and a unified data repository (UDR), an Application Function (AF), and a Data Network (DN). The terminal may access the 5G core network through the base station.

The AMF is a network function (NF) for managing wireless network access and mobility of a terminal.

The SMF is an NF for managing a session for a terminal, and session information includes quality-of-service (QoS) information, charging information, and information about packet processing.

The UPF is an NF for processing user traffic (e.g., user plane traffic), and is controlled by the SMF.

The PCF is an NF that manages an operator policy (e.g., a public land mobile network (PLMN) policy) for providing a service in a wireless communication system. In addition, the PCF may be divided into a PCF responsible for an access and mobility (AM) policy and a UE policy and a PCF responsible for a session management (SM) policy. The PCF responsible for AM/UE policies and the PCF responsible for an SM policy may be logically or physically separate NFs or may be a logically or physically single NF.

The UDM is an NF for storing and managing terminal subscription information (e.g., a UE subscription).

The UDR is an NF or a database (DB) for storing and managing data. The UDR may store terminal subscription information and may provide the terminal subscription information to the UDM. Further, the UDR may store operator policy information, and may provide the operator policy information to the PCF.

The NSSF may be an NF for selecting network slice instances, which service a terminal, or for determining network slice selection assistance information (NSSAI).

The NSACF may be an NF for managing a network slice use situation (e.g., the number of registered terminals for each network slice, the number of sessions established, etc.) and determining whether to allow registration of a terminal and session establishment.

The AUSF may be an NF for performing a function of supporting authentication for 3GPP access and non-3GPP access.

The AF may be an NF for providing a function for a service according to the disclosure.

The DN may be a data network capable of providing operator service, Internet access, a 3rd party service, etc.

Figure 2:
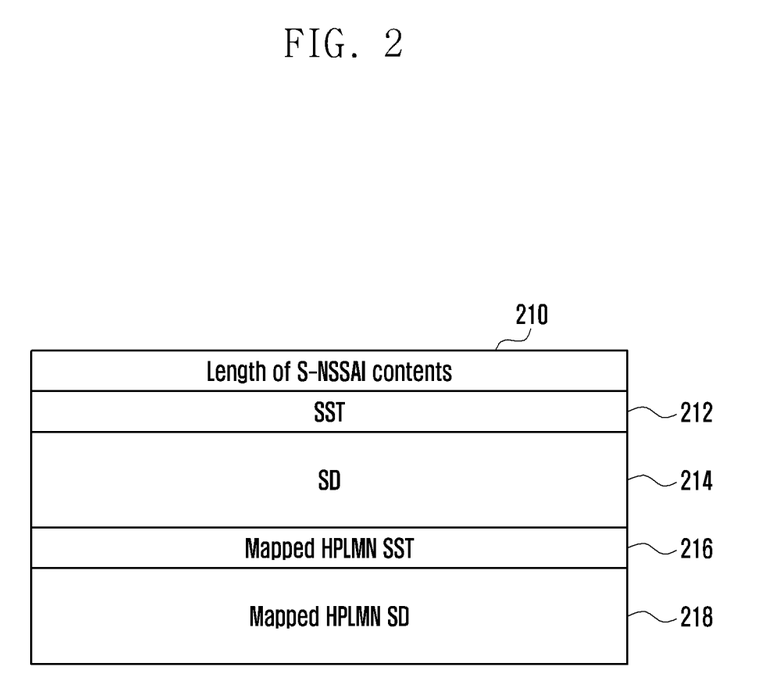
FIG. 2 illustrates a network slice information element (IE) according to an embodiment.

FIG. 2 illustrates a network slice IE according to an embodiment. Specifically, as single-network slice selection assistance information (S-NSSAI) defined in 3GPP may be used as a differentiator for differentiating a network slice, FIG. 2 provides an example of an S-NSSAI IE.

Referring to FIG. 2, an S-NSSAI includes a slice/service type (SST) 216 used in a home PLMN (HPLMN), a slice differentiator (SD) 218 used in HPLMN, an SST 212 used in a serving PLMN, and an SD 214 used in a serving PLMN. The S-NSSAI IE further includes a field 210 indicating the length of a content included in the S-NSSAI IE.

In a non-roaming situation, the SST 212 used in the serving PLMN may be the same as the SST 216 used in the HPLMN. Further, the SD 214 used in the serving PLMN may be the same as the SD 218 used in the HPLMN.

In a roaming situation, the SST 212 used in the serving PLMN may be an SST used in a visited PLMN (VPLMN), and the SD 214 used in the serving PLMN may be an SD used in the VPLMN.

SST and SD values constituting one piece of S-NSSAI may be present or not present depending on the situation.

The NSSAI may include one or more pieces of S-NSSAI. Examples of the NSSAI may include configured NSSAI (or configured S-NSSAI) stored in a terminal, requested NSSAI (or requested S-NSSAI) requested by the terminal, allowed NSSAI (or allowed S-NSSAI) which the terminal is allowed to use, rejected NSSAI (or rejected S-NSSAI) which the terminal is rejected from using, pending NSSAI (or pending S-NSSAI) indicating that whether use by the terminal is possible (allowance or rejection) is being processed, subscribed NSSAI stored as terminal subscription information in the UDM, etc. However, these are only examples, examples of the NSSAI are not limited to the above-mentioned examples.

In accordance with an embodiment, the disclosure provides an example of a method for managing the number of sessions established for each network slice.

An NSACF may store information about the maximum number of sessions for each network slice (identifiable as S-NSSAI) subject to network slice admission control (NSAC) (S-NSSAI subject to NSAC). The S-NSSAI subject to the NSAC may include information about whether a corresponding slice is subject to control of the maximum number of terminals or information about whether the corresponding slice is subject to control of the maximum number of sessions. When a specific slice is subject to NSAC (or when the specific slice is subject to NSAC related to control of the maximum number of sessions), the NSACF may receive and store the slice-specific maximum number of sessions in the corresponding slice from another 5G NF (e.g., an AMF, an SMF, a PCF, a UDM, a UDR, etc.). Alternatively, in the NSACF, information about maximum session number for each slice may be configured through operations, administration, and maintenance (OAM) (or operations and maintenance (O&M)).

The NSACF may control the number of sessions currently established for each slice. Controlling the number of currently established sessions may include increasing the number of currently established sessions by one when a new session is established. The NSACF may perform control such that the number of currently established sessions does not exceed the maximum number of sessions. Controlling the number of currently established sessions may also include decreasing the number of currently established sessions by one when an established session is released.

The NSACF may manage a list of PDU session ID(s) established in connection with a network slice. The NSACF may manage a network slice, terminal Ms of PDU session ID(s) established in connection with the network slice (e.g., a list of UE IDs), and a list of the PDU session IDs. The NSACF may identify one PDU session as a combination of a terminal ID and a PDU session ID (e.g., a combination of UE ID and PDU Session ID). Alternatively, the NSACF may manage a list of PDU session IDs established for each terminal indicated by a terminal ID (per UE or per UE ID).

One PDU session ID may be used as a unique session identifier in one terminal. That is, different PDU sessions established by different terminals may use an identical PDU session ID, and thus, in a network supporting multiple terminals, one PDU session may be uniquely identified by using a PDU session ID. Therefore, the NSACF may use a UE ID together with a PDU session ID to uniquely identify one PDU session.

In order to increase the number of currently established sessions, the NSACF may determine whether a PDU session indicated by a requested PDU session ID and a requested terminal ID has been already included in a list managed by the NSACF. If the PDU session is not included in the list managed by the NSACF, the NSACF may add the PDU session ID and the terminal ID, which are requested, to the list managed by the NSACF, and may increase the number of currently established sessions.

An SMF may perform PDU session establishment in a network slice subject to NSAC (S-NSSAI subject to NSAC) (or a network slice subject to NSAC related to control of the maximum number of sessions). The SMF may receive, from another 5G NF (e.g., an AMF, a PCF, UDM, a UDR, an NSACF, etc.), information about whether a specific network slice is subject to NSAC. Alternatively, in the SMF, information about whether a specific network slice is subject to NSA may be configured through OAM.

In order to perform PDU session establishment in a network slice subject to NSAC, the SMF may determine to check whether a current corresponding network slice is available.

The SMF may discover and select, based on the determination, an NSACF responsible for NSAC related to the maximum number of sessions of the corresponding network slice.

The SMF may transmit an NF (NSACF) discovery request message to an NRF. The NF (NSACF) discovery request message may include network slice information (e.g., S-NSSAI) and an indicator indicating that an NSACF (e.g., target NF or target NSACF) desired to be discovered has to provide an NSAC function related to control of the number of sessions. The NRF may search for an NSACF satisfying a condition requested by the SMF. The NRF may transmit an NF (NSACF) discovery response message to the SMF. The NF (NSACF) discovery response message may include information about an NSACF discovered by the NRF.

Alternatively, NSACF information may be configured in the SMF, and thus the SMF may use the configured NSACF information.

The SMF may send a maximum session number control request message to an NSACF received from the NRF or configured in the SMF.

For convenience of a description, the disclosure has been made with reference to an SMF operation, but the disclosure is not limited thereto. For example, an embodiment described in the disclosure may also be performed by an AMF.

Figure 3:
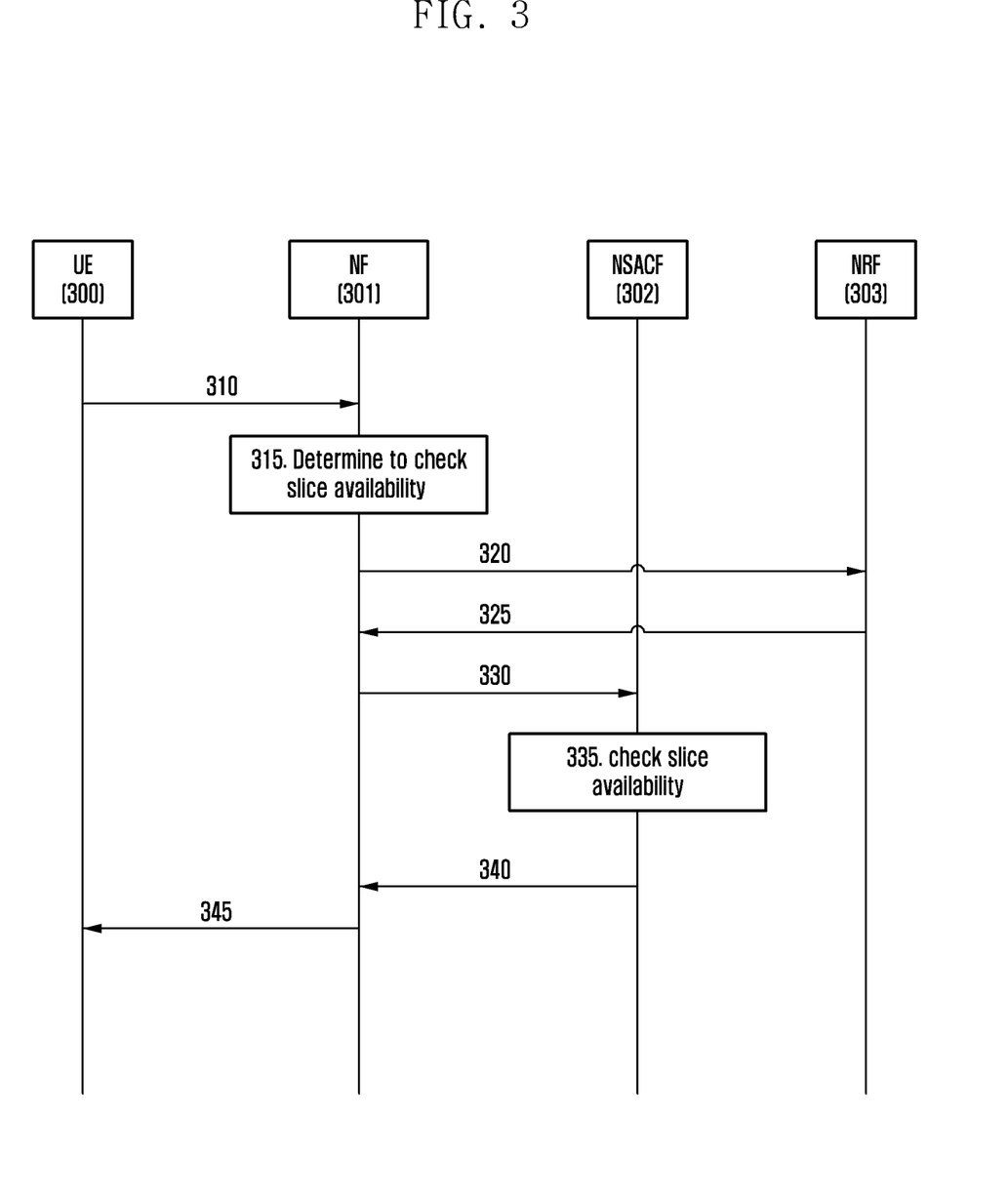
FIG. 3 is a signal flow diagram illustrating an availability check procedure based on a number of sessions established for each network slice according to an embodiment.

FIG. 3 is a signal flow diagram illustrating an availability check procedure based on a number of sessions established for each network slice according to an embodiment. For convenient description, an NF 301 is described as being performed by an SMF in FIG. 3, but the disclosure may also be applied to an AMF.

Referring to FIG. 3, in step 310, a terminal 300 transmits a PDU session establishment request message to the NF 301 via an AMF. The PDU session establishment request message may include at least one of a PDU session ID, a terminal ID, or S-NSSAI.

In step 315, the NF 301 determines, based on at least one of a policy configured in the NF 301 and information received from another 5G NF (e.g., an AMF, a PCF, UDM, a UDR, an NSACF etc.), whether S-NSSAI requested by the terminal 300 (or S-NSSAI received from the AMF) is subject to NSAC (or is subject to NSAC related to control of the number of sessions established).

Alternatively, when the NF 301 is performed by an AMF and when S-NSSAI is not included in the PDU session establishment request message in step 310, the NF 301 may select one piece of S-NSSAI, based on a policy configured in the NF 301. The NF 301 may then determine, based on at least one of the policy configured in the NF 301 and information received from another 5G NF (e.g., a PCF, UDM, a UDR, an NSACF, etc.), whether S-NSSAI requested by the terminal (or S-NSSAI selected by the AMF) is subject to NSAC (or is subject to NSAC related to control of the number of sessions established).

In step 320, the NF 301 (i.e., the SMF) transmits an NF discovery request message to an NRF 303. The NF discovery request message may include at least one among S-NSSAI and information about the capability of a required target NSACF. The capability of the required target NSACF may indicate that the target NSACF has to support an NSAC function related to control of the number of sessions.

The NRF 303 may discover and select the required target NSACF.

In step 325, the NRF 303 transmits an NF discovery response message to the NF 301. The NF discovery response message may include information about target NSACF selected by the NRF.

In step 330, the NF 301 transmits a slice availability request message to an NSACF 302. The NSACF 302 may be selected by the NF 301 based on information received from the NRF 303 in step 325 and/or the information configured in the NF 301. The NF 301 may store the selected NSACF information, and then may perform, as necessary, interaction with NSACF.

The slice availability request message may include information for uniquely identifying one PDU session, e.g., a PDU session ID and/or a terminal ID. Further, the slice availability request message may include S-NSSAI.

In step 335, the NSACF 302 checks the number of sessions established in a network slice identified using the S-NSSAI. The NSACF 302 may check whether a PDU session indicated by the received PDU session ID and the received terminal ID is included in a list managed by the NSACF. If the PDU session is not included in the list managed by the NSACF 302, the NSACF 302 may add a received PDU session ID and terminal ID to the list managed by the NSACF, and may increase the number of currently established sessions.

The NSACF 302 may control/manage the number of currently established sessions, based on information about the maximum number of sessions that is configured in the NSACF 302 or is received from another 5G NF (e.g., an AMF, an SMF, a PCF, UDM, a UDR, etc.). For example, The NSACF 302 may compare the number of currently established sessions, managed by the NSACF 302, with the maximum number of sessions, and may determine whether the number of currently established sessions does not exceed the maximum number of sessions.

In step 340, the NSACF 302 transmits a slice availability response message to the NF 301.

When the PDU session indicated by the PDU session ID and the terminal ID, received in step 330, is not included in the list managed by the NSACF, and when the number of currently established sessions does not exceed the maximum number of sessions, the NSACF 302 may include, in the slice availability response massage, information indicating that S-NSSAI is available (e.g., information indicating that PDU session establishment for the S-NSSAI is allowed).

When the PDU session indicated by the PDU session ID and the terminal ID received in step 330 is not included in the list managed by the NSACF, and when the number of currently established sessions exceeds the maximum number of sessions, the NSACF 302 may include, in the slice availability response message, information including that S-NSSAI is unavailable (e.g., information indicating that PDU session establishment for the S-NSSAI is not allowed).

When the PDU session indicated by the PDU session ID and the terminal ID received in step 330 is already included in the list managed by the NSACF, the NSACF 302 may include, in the slice availability response message, information indicating that the PDU session requested in step 330 is already counted, or information indicating that S-NSSAI is available (e.g., information indicating that PDU session establishment for the S-NSSAI is allowed).

In step 345, the NF 301 transmits a PDU session establishment response message to the terminal 300.

When the NF 301 has received, in step 340, from the NSACF 302, the information indicating that S-NSSAI is available or the information indicating that the requested PDU session has been already counted, the NF 301 may determine that the corresponding network slice is available. Thus, the NF 301 may perform a PDU session establishment procedure. When the PDU session establishment procedure is successfully performed, the NF 301 transmits a PDU session establishment admission message to the terminal 300 in step 345.

When the NF 301 has received, in step 340, from the NSACF 302, the information indicating that S-NSSAI is unavailable, the NF 301 may determine that the corresponding network slice is currently unavailable. Thus, the NF 301 may determine to reject PDU session establishment without performing the PDU session establishment and may transmit a PDU session establishment rejection message to the terminal 300 in step 345.

Figure 4:
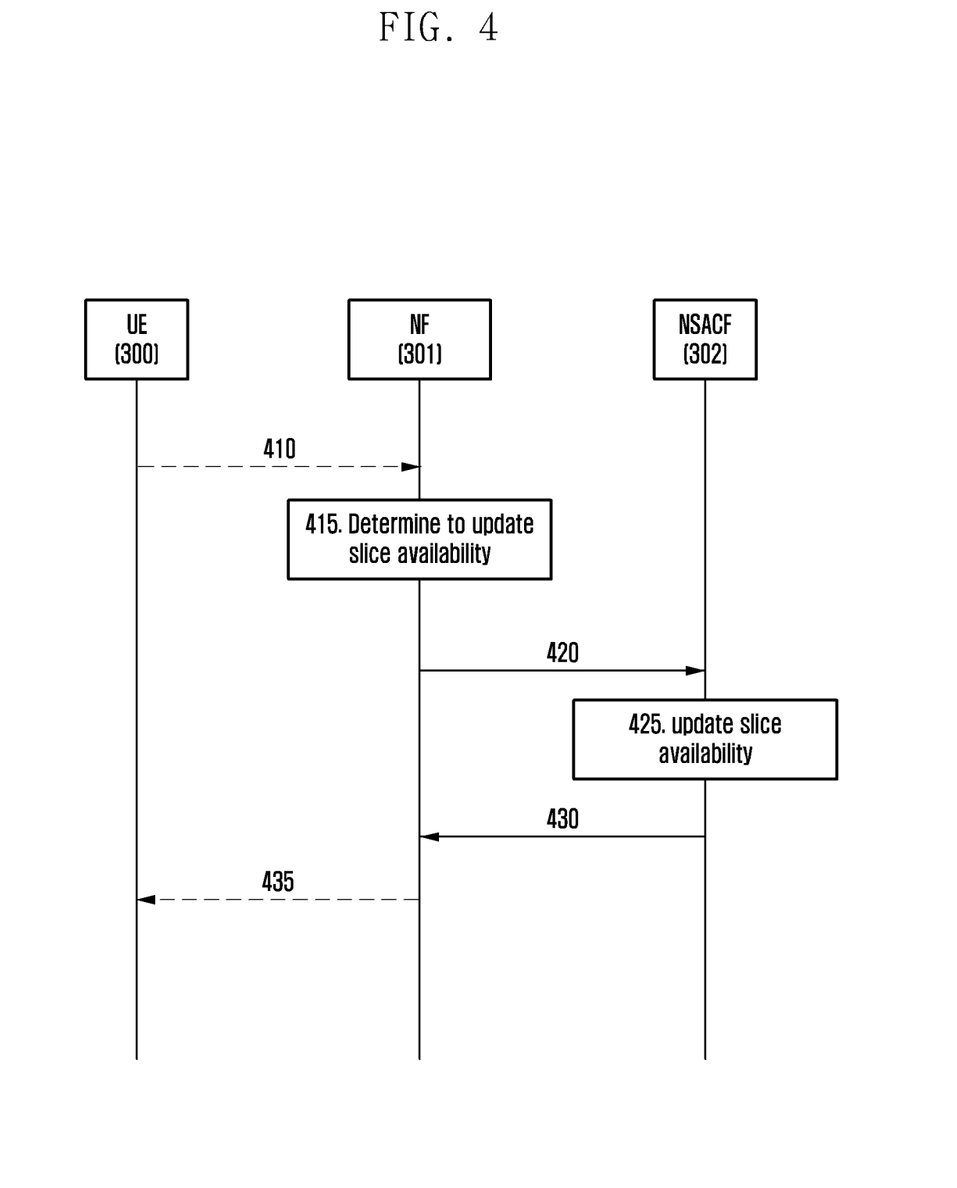
FIG. 4 is a signal flow diagram illustrating a procedure of updating availability based on a number of sessions established for each network slice according to an embodiment.

FIG. 4 is a signal flow diagram illustrating a procedure of updating availability based on a number of sessions established for each network slice according to an embodiment. For convenient description, the NF 301 is described as being performed by an SMF, but is not limited thereto. For example, the NF 301 may be performed by an AMF.

Referring to FIG. 4, in step 415, the NF 301 determines to release an established PDU. The determination may be based on a PDU session release request received from a terminal 300 or a request (a PDU session release request, a session management (SM) policy end request, etc.) received from another 5G NF (e.g., an AMF, a PCF, UDM, a UDR, etc.) in step 410.

The NF 301 may determine, based on a method described in the disclosure, whether S-NSSAI linked with a corresponding PDU session is a network slice subject to NSAC (or is subject to NSAC related to control of the number of sessions established).

When the S-NSSAI linked with the corresponding PDU session is a network slice subject to NSAC, the NF 301 transmits a slice availability update request message to an NSACF 302 in step 420. The slice availability update request message may include information for uniquely identifying a PDU session to be released, e.g., a PDU session ID and/or a terminal ID. Further, the slice availability update request message may include S-NSSAI.

In step 425, the NSACF 302 updates the number of sessions established in a network slice identified using the S-NSSAI. The NSACF 302 may check whether a PDU session indicated by the received PDU session ID and the received terminal ID has been already included in a list managed by the NSACF 302. When the PDU session is included in the list managed by the NSACF 302, the NSACF 302 may delete the received PDU session ID and the received terminal ID from the list managed by the NSACF, and may decrease the number of currently established sessions.

In step 430, the NSACF 302 transmits a slice availability update response message to the NF 301. The slice availability update response message may include result information (e.g., success, failure, etc.) related to updating the number of sessions established in the network slice.

The NF 301 may continuously perform a PDU session release procedure.

When PDU session release was begun in response to a request from the terminal 300 (in step 410), the NF 301 may transmit a PDU session release message to the terminal 300 in step 435.

Figure 5:
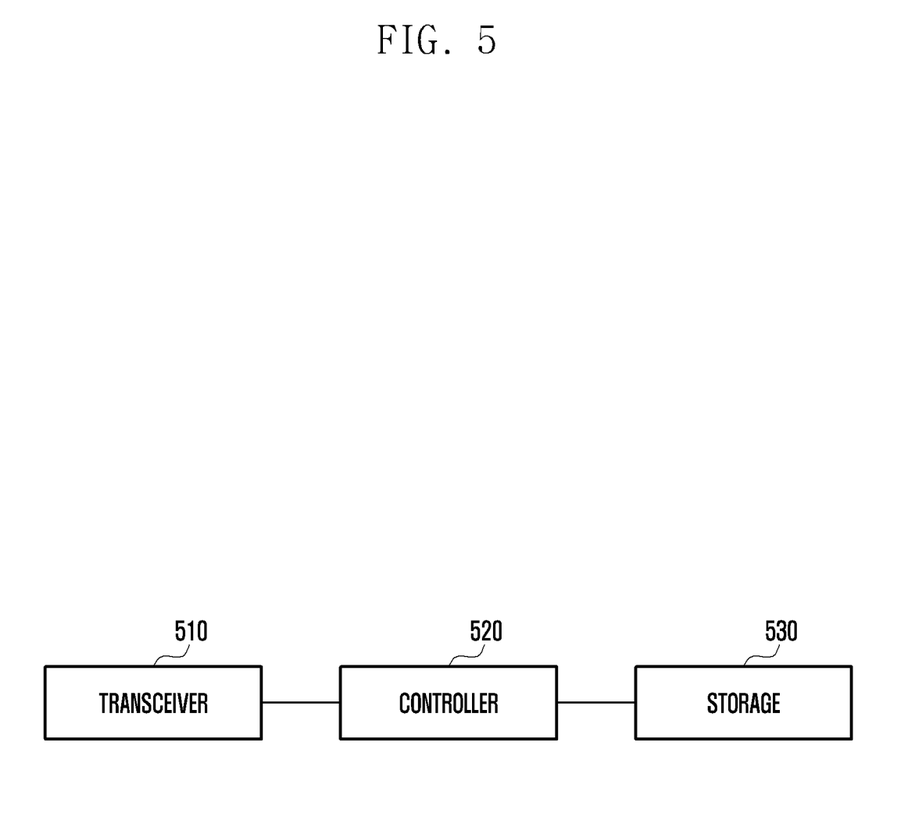
FIG. 5 illustrates a terminal according to an embodiment.

FIG. 5 illustrates a terminal according to an embodiment.

Referring to FIG. 5, a terminal includes a transceiver 510, a controller 520, and a storage 530. The controller may be a circuit, an application-specific integrated circuit, and/or at least one processor.

The transceiver 510 may transmit or receive signals to or from another network entity. The transceiver 510 may receive system information from a network entity, and may receive a synchronization signal or a reference signal.

The controller 520 may control overall operations of the terminal.

The storage 530 may store at least one of information transmitted or received through the transceiver 510 and information generated through the controller 520.

Figure 6:
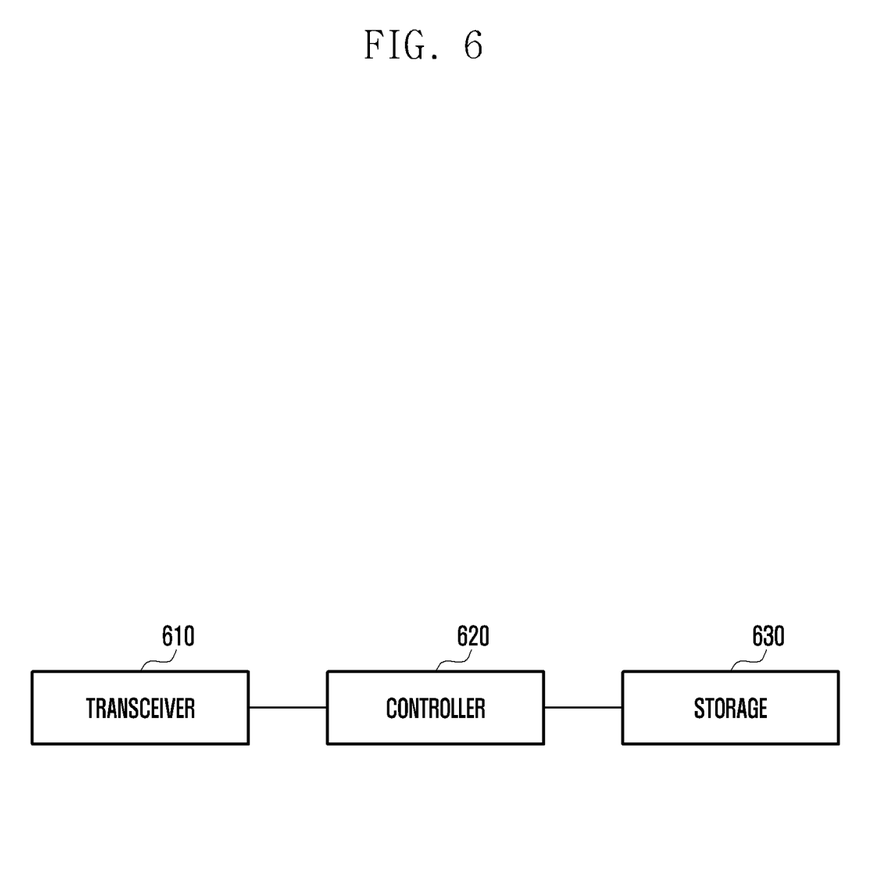
FIG. 6 illustrates a network entity according to an embodiment.

FIG. 6 illustrates a network entity according to an embodiment.

Referring to FIG. 6, a network entity includes a transceiver 610, a controller 620, and a storage 630. The controller may be a circuit, an application-specific integrated circuit, and/or at least one processor.

The transceiver 610 may transmit or receive signals to or from another network entity. The transceiver 610 may receive system information from a network entity, and may receive a synchronization signal or a reference signal.

The controller 620 may control overall operations of a network entity.

The storage 630 may store at least one of information transmitted or received through the transceiver 610 and information generated through the controller 620.

Figure 7:
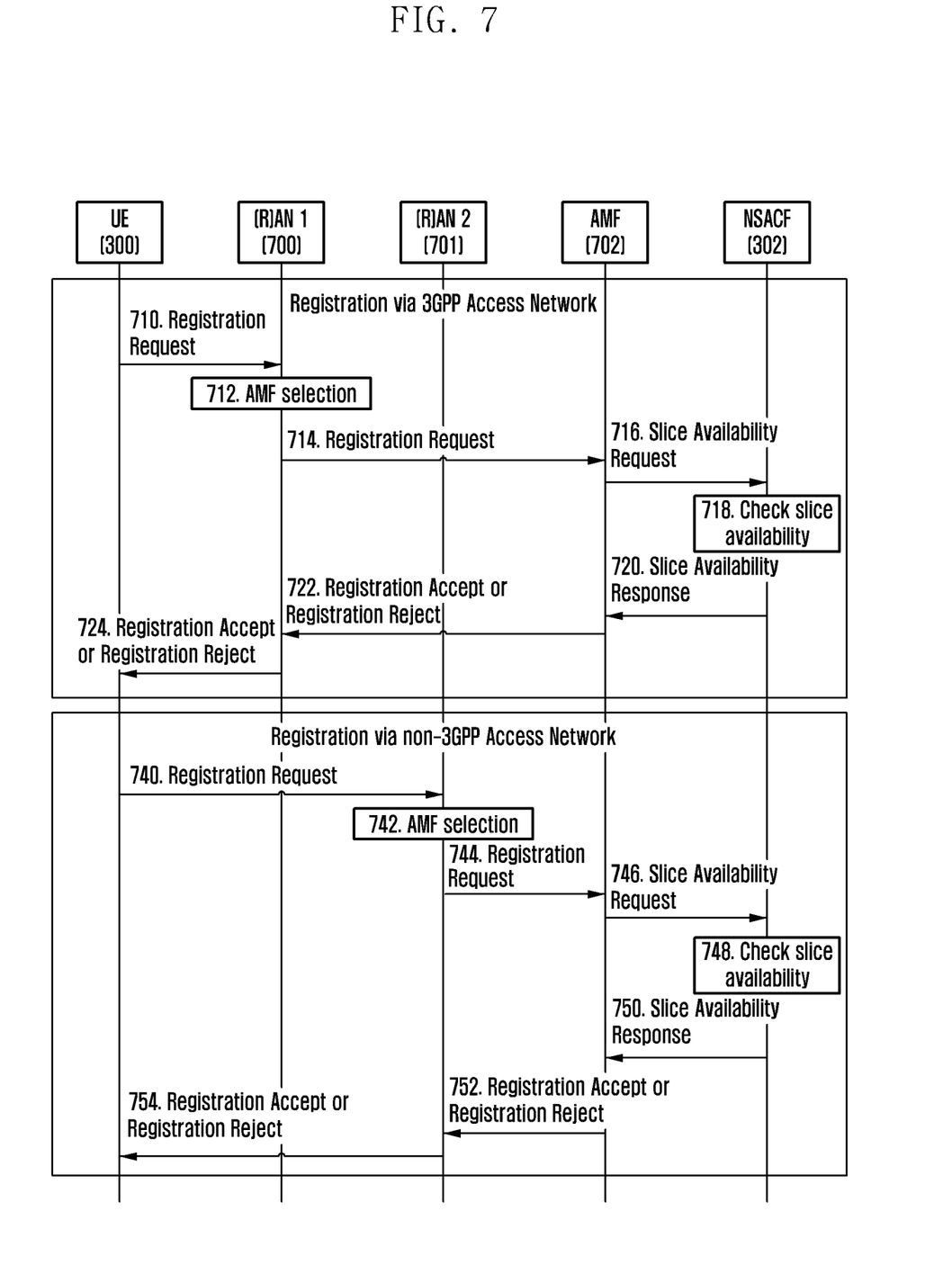
FIG. 7 is a signal flow diagram illustrating a terminal registration procedure according to an embodiment.

FIG. 7 is a signal flow diagram illustrating a terminal registration procedure according to an embodiment.

Referring to FIG. 7, a terminal 300 may access a registration procedure with a first base station 700 and a second base station 701 to perform a registration procedure with an AMF 702. The first base station 700 may support 3GPP access and the second base station 701 may support non-3GPP (N3GPP) access. Although FIG. 7 illustrates the first base station 700 and the second base station 701 being connected to the same AMF 702, the first base station 700 and the second base station 701 may also be connected to different AMFs.

In step 710, the terminal 300 accesses the first base station 700 to transmit a registration request message. The registration request massage may include information about a requested slice (requested NSSAI, S-NSSAI A) which the terminal 300 desires to use.

In step 712, the first base station 700 having received the registration request message may transmit, selects, based on requested NSSAI received from the terminal 300, an AMF to which the registration request is to be transmitted. For example, the first base station 700 may select an AMF capable of supporting the requested NSSAI.

In step 714, the first base station 700 transmit the registration request message to the AMF 702 selected in step in 712. The AMF 702 may determine an allowed slice (allowed NSSAI), based on a request slice (requested NSSAI) of the terminal, a terminal subscription slice (subscribed S-NSSAI), a terminal access network (3GPP access network (access type)), or an operator policy. The AMF 702 may include the requested slice (e.g., S-NSSAI A) of the terminal in the allowed slice (e.g., S-NSSAI A).

In step 716, the AMF 702 checks slice availability from the NSACF 302 of a 5G core network before determining to allow an allowed slice to the terminal 300. To this end, the AMF 702 transmits a slice availability request message to the NSACF 302 in step 716. The slice availability request message may include at least one among target slice information (e.g., S-NSSAI, requested NSSAI, allowed NSSAI, subscribed S-NSSAI, etc.), terminal access network information (e.g., 3GPP access), terminal position information (e.g., TA, etc.), and terminal information (e.g., SUPI, 5G-GUTI, etc.).

In step 718, the NSACF 302 checks a slice policy of a target slice (e.g., S-NSSAI, requested NSSAI, allowed NSSAI, subscribed S-NSSAI, etc.), which is received from the AMF 702, and the number of currently accessed terminals of the target slice.

For example, the NSACF 302 may check whether a terminal ID (e.g., SUPI, 5G-GUTI, etc.) is included in a terminal ID list managed by the NSACF 302 in order to monitor the number of S-NSSAI terminal registrations. In addition, the NSACF 302 may check whether access network information is included in the terminal ID list managed by the NSACF 302 in order to monitor the number of S-NSSAI terminal registrations. When a terminal ID and/or an access network is not included in the terminal ID list, the NSACF 302 may include the terminal ID and/or the access network in the terminal ID list, and may increase counting of the number of terminals.

In step 720, the NSACF 302 transmits a slice availability response message to the AMF 702. The slice availability response message may include at least one of target slice information (e.g., S-NSSAI, requested NSSAI, allowed NSSAI, subscribed S-NSSAI, etc.) and information about whether target slice is available (e.g., an indication indicating availability or unavailability, a cause value, etc.).

The AMF 702 may determine an allowed slice, based on the information about whether the slice is available that is received from the NSACF 302. For example, when the information indicating that a slice (S-NSSAI) is available has been received from the NSACF 302, the AMF 702 may include the slice (S-NSSAI) in an allowed slice. In another example, when the NSACF 302 has transmitted a message indicating that a slice (S-NSSAI) is unavailable, the AMF 702 may include the slice (S-NSSAI) in a rejected slice (rejected NSSAI) without including the slice (S-NSSAI) in an allowed slice.

In step 722, the AMF 702 transmits, to the terminal 300, a response message (e.g., a registration accept or registration reject message) responding to the registration request message received in step 714. The registration accept message may include at least one of an allowed slice (allowed NSSAI) and a rejected slice (rejected NSSAI). When there is no slice available by the terminal, the AMF 702 may transmit a registration reject message.

In step 724, the first base station 700 transmits, to the terminal 300, the registration accept or registration reject message received from the AMF 702.

In step 740, the terminal 300 accesses the second base station 701 to transmit a registration request message. The registration request message may include a requested slice (requested NSSAI, e.g., S-NSSAI A) to be used by the terminal.

In step 742, the second base station 701 having received the registration request message selects, based on the requested NSSAI and/or a terminal ID (e.g., 5G-GUTI, etc.) received from the terminal 300, an AMF to which the registration request is to be transmitted. For example, the second base station 701 may select an AMF which may be indicated by the terminal ID (e.g., 5G-GUTI, etc.).

In step 744, the second base station 701 transmits the registration request message to the AMF 702 selected in step 742. The AMF 702 may determine an allowed slice (e.g., allowed NSSAI), based on a requested slice (requested NSSAI) of the terminal 300, terminal subscription slice (subscribed S-NSSAI), a terminal access network (non-3GPP AN), or an operator policy. Further, in determining the allowed slice, the AMF 702 may consider the allowed slice and/or the rejected slice determined steps 710 to 724. For example, the AMF 702 may include the requested slice (e.g., S-NSSAI A) of the terminal to the allowed slice (e.g., S-NSSAI A).

In step 746, the AMF 702 checks slice availability from the NSACF 302 of a 5G core network before determining to allow an allowed slice to the terminal 300. To this end, the AMF 702 transmits a slice availability request message to the NSACF 302 in step 746. The slice availability request message may include at least one among target slice information (e.g., S-NSSAI, requested NSSAI, allowed NSSAI, subscribed S-NSSAI, etc.), terminal access network information (e.g., non-3GPP access), terminal position information (e.g., TA, etc.), and terminal information (e.g., SUPI, 5G-GUTI, etc.).

In step 748, an NSACF 302 checks a slice policy of a target slice (e.g., S-NSSAI, requested NSSAI, allowed NSSAI, subscribed S-NSSAI, etc.), which is received from the AMF 702, and the number of currently accessed terminals of the target slice.

For example, the NF 302 may check whether a terminal ID (e.g., SUPI, 5G-GUTI, etc.) is included in a terminal ID list managed by the NSACF 302 in order to monitor the number of S-NSSAI terminal registrations. In addition, the NSACF 302 may check whether access network information is included in the terminal ID list managed by the NSACF 302 in order to monitor the number of S-NSSAI terminal registrations. When a terminal ID and/or an access network are included in the terminal ID list, the NSACF 302 may determine that the terminal is already included in the number of terminal registration. Thus, the NSACF 302 may not increase counting of the number of terminals.

For example, in the case in which the number of terminal registrations is counted based on the number of terminals, when the terminal ID received in step 746 is included in the terminal ID list managed by the NSACF 302 (the terminal list is included in the terminal ID list in step 718), the NSACF 302 may determine that the terminal is already included in the number of terminal registrations, and thus may not increase counting of the number of terminals. In this case, the terminal 300 is already registered, and thus a message in step 750 may include information indicating that a target slice is available.

Alternatively, in the case in which the number of terminal registrations is counted based on the number of registrations, when the terminal ID received in step 746 is included in the terminal ID list managed by the NSACF 302 (e.g., the terminal ID is included in step 718), but when an access network (non-3gpp access) received in step 746 is not included in the terminal ID list managed by the NSACF 302 (e.g., 3GPP access is included in operation 718), the NSACF 302 may determine that the terminal 300 is not included in the number of terminal registrations, and thus the NSACF 302 may include the access network in the terminal ID list, and may increase counting of the number of terminals. In this case, when the number of current terminals exceeds the maximum number of terminals, counting of the number of terminals may not be increased, the access network may be included in the terminal ID list. A message in step 750 may include information indicating that a target slice is unavailable.

In step 750, the NSACF 302 may transmit a slice availability response message to the AMF 702. The slice availability response message may include at least one of target slice information (e.g., S-NSSAI, requested NSSAI, allowed NSSAI, subscribed S-NSSAI, etc.) and information about whether target slice is available (e.g., an indication indicating availability or unavailability, a cause value, etc.).

The AMF 702 may determine an allowed slice, based on the information about whether the slice is available that is received from the NSACF 302. For example, when the information indicating that a slice (S-NSSAI) is available has been received from the NSACF 302, the AMF 702 may include the slice (S-NSSAI) in an allowed slice. As another example, when information indicating that a slice (S-NSSAI) is unavailable is received from the NSACF 302 has transmitted, the AMF 702 may include the slice (S-NSSAI) in a rejected slice (rejected NSSAI) without including the slice (S-NSSAI) in an allowed slice.

In step 752, the AMF 702 transmits, to the terminal 300, a response message (e.g., a registration accept or registration reject message) responding to the registration request message received in step 744. The registration accept message may include at least one of an allowed slice (allowed NSSAI) and a rejected slice (rejected NSSAI). When there is no slice available by the terminal, the AMF 702 may transmit a registration reject message.

In step 754, the second base station 701 transmits, to the terminal 300, the registration accept or registration reject message received from the AMF 702.

According to an embodiment of the disclosure, the NSACF 302 may determine slice availability for each terminal registration. Thus, even when the terminal 300 requests an identical slice (e.g., S-NSSAI A) in steps 710 and 740, the availability of the corresponding slice may vary depending on a time point at which step 718 or 748 is performed, That is, the NSACF 302 in step 718 may determine that a corresponding slice (e.g., S-NSSAI A) is available, but the NSACF 302 in step 748 may determine that the corresponding slice (e.g., S-NSSAI A) is unavailable. Therefore, the AMF 702 may include corresponding slice (e.g., S-NSSAI A) as allowed NSSAI in the registration accept message transmitted in step 722 and then may transmit the message to the terminal 300. However, the AMF 702 may include the corresponding slice (e.g., S-NSSAI A) as rejected NSSAI in the registration accept message transmitted in step 752, and then may transmit the message to the terminal 300.

Although FIG. 7 sequentially illustrates a registration procedure of a 3GPP access network and a registration procedure of a non-3GPP access network, the registration procedure of a 3GPP access network may be performed after the registration procedure of a non-3GPP access network is performed.

Figure 8:
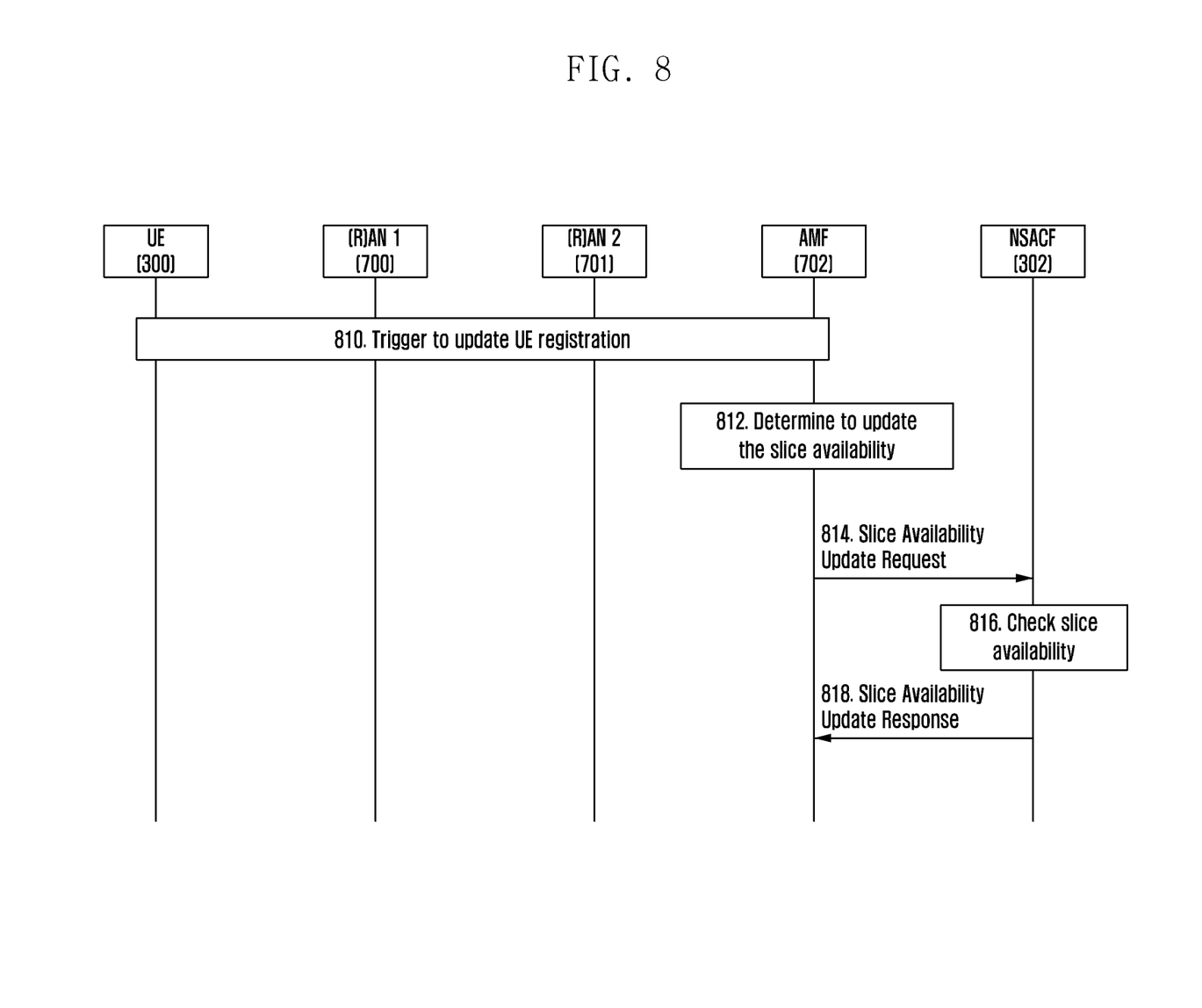
FIG. 8 is a signal flow diagram illustrating a procedure of decreasing a number of terminal registrations according to an embodiment.

FIG. 8 is a signal flow diagram illustrating a procedure of decreasing a number of terminal registrations according to an embodiment.

Referring to FIG. 8, in step 810, an AMF 702 determines to delete S-NSSAI provided to a terminal in the procedure in FIG. 7) from allowed NSSAI.

In step 812, the AMF 702 determines whether the S-NSSAI, determined to be deleted from the allowed NSSAI in step 810 is subject to counting the number of terminals (S-NSSAI subject to NSAC), When the S-NSSAI is subject to NSAC, the AMF 702 may determine to perform, with an NSACF 302, a procedure of updating the number of terminal registrations.

In step 814, the AMF 702 transmits a slice availability update request message to the NSACF 302. The slice availability update request message may include S-NSSAI, a terminal ID, or current access network information (e.g., 3GPP, non-3GPP, etc.) of a terminal. Further, the slice availability update request message may include an indicator indicating that the number of terminal registrations should be decreased.

In step 816, the NSACF 302 updates the number of currently accessed terminals in the received S-NSSAI. For example, when the number of terminal registrations is counted based on the number of registrations, the NSACF 302 may check whether the terminal ID and the access network, received in step 814, are included in a terminal ID list managed by the NSACF 302. When the terminal ID and the access network is included, the NSACF 302 may delete the corresponding terminal ID and the access network from the terminal ID list managed by the NSACF 302, and may decrease the number of terminal registrations. That is, when access to a 3GPP access network and a non-3GPP access network is simultaneously made using an identical terminal ID, the NSACF 302 may delete the access network received in step 814 from the terminal ID list managed by the NSACF 302.

Alternatively, when the number of terminal registrations is counted based on the number of terminals, the NSACF 302 may check whether the terminal ID and the access network received in step 814 are included in the terminal ID list managed by the NSACF 302. When the terminal ID and the access network are included, the NSACF 302 may delete the corresponding access network from the terminal ID list managed by the NSACF 302. However, when another access network is registered using an identical terminal ID, the NSACF 302 may maintain the number of terminal registrations as it is without decreasing the number of terminal registrations. That is, when access to a 3GPP access network and a non-3GPP access network is simultaneously made using an identical terminal ID, the NSACF 302 may delete the access network received in step 814 from the terminal ID list managed by the NSACF 302. However, the terminal 300 is still connected to a network as another access network, and thus the NSACF 302 may not delete the terminal ID from the terminal ID list, and may maintain the number of terminal registrations as it is without decreasing the number of terminal registrations.

Figure 9:
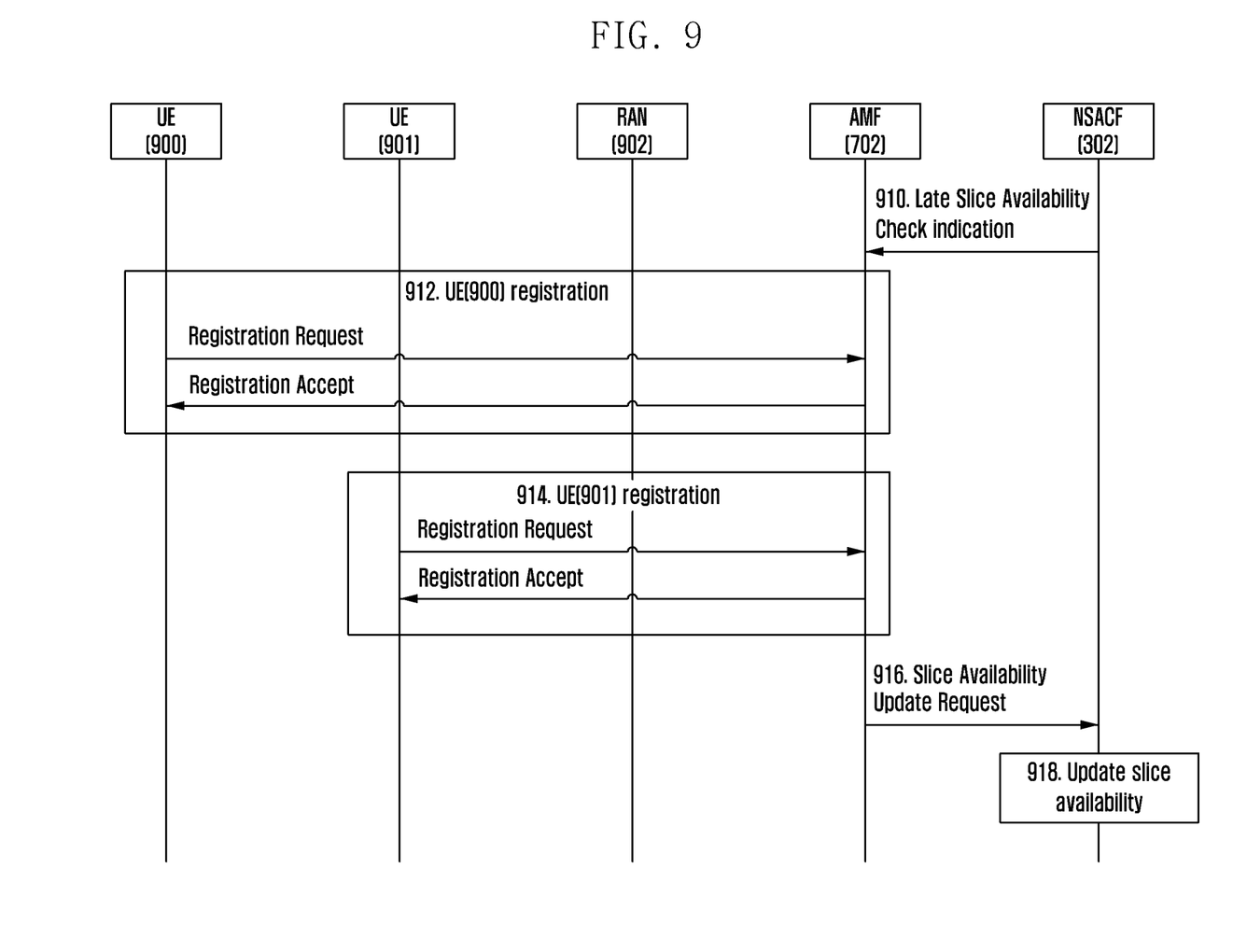
FIG. 9 is a signal flow diagram illustrating a bulk terminal registration update procedure according to an embodiment.

FIG. 9 is a signal flow diagram illustrating a bulk terminal registration update procedure according to an embodiment.

Referring to FIG. 9, in step 910, the NSACF 302 transmits, to the AMF 702, an indicator indicating that slice availability checking may be performed late (e.g., need not be performed early). For example, when the number of currently accessed registered terminals is significantly smaller than the maximum number of registered terminals, the NSACF 302 may determine to transmit the indicator to the AMF 702. The AMF 702 may store information received from the NSACF 302.

In step 912, the AMF 702 processes a registration procedure for a first terminal 900. During the registration procedure, the AMF 702 may omit a slice availability check procedure, based on the indicator received in step 910. That is, steps 716 to 720 in FIG. 7 may be determined to be performed after operation 724.

In step 914, the AMF 702 processes a registration procedure for a second terminal 901. During the registration procedure, the AMF 702 may omit the slice availability check procedure, based in the indicator received in step 910.

After steps 912 and 914 are completed, in step 916, the AMF 702 transmits, to the NSACF 302, a slice availability update request message in order to update the registered terminal. The slice availability update request message may include S-NSSAI, at least one registered terminal ID (a list of UE IDs), that is, a UE ID of the UE 900 and a UD ID of the UE 901, or information about a network accessed by each terminal.

In step 918, the NSACF 302 updates, based on the information received in step 916, a terminal ID list managed by the NSACF 302 and the number of currently registered terminals. For example, the NSACF 302 may add the UE ID of the UE 900 and the UE ID of the UD 901 ID to the terminal ID list. Further, the NSACF 302 may add, to the terminal ID list, an access network of the UE 900 and an access network of the UE 901. The NSACF 302 may increase the number of currently accessed terminals by the number of terminals, that is, twice.

According to another example, the message in step 916 may include S-NSSAI, a registered terminal ID, or multiple access networks assessed by the terminal. The NSACF 302 may update, based on the information received in step 916, the terminal ID list managed by the NSACF 302 and the number of currently registered terminals. For example, the NSACF 302 may add a UE ID to the terminal ID list. Further, the NSACF 302 may add, to the terminal ID list, the multiple access networks (3GPP access and non-3GPP access) of the UE. The NSACF 302 may increase the number of currently accessed terminals by the number of terminals, that is, twice.

The embodiments of the disclosure described and shown in the specification and the drawings are merely specific examples that have been presented to easily explain the technical contents of the disclosure and help understanding of the disclosure, and are not intended to limit the scope of the disclosure. Therefore, the scope of the disclosure should be construed to include, in addition to the embodiments disclosed herein, all changes and modifications derived on the basis of the technical idea of the disclosure.

Methods based on the claims or the embodiments disclosed in the disclosure may be implemented in hardware, software, or a combination of both.

When implemented in software, a computer readable storage medium for storing one or more programs (software modules) may be provided. The one or more programs stored in the computer readable storage medium are configured for execution performed by one or more processors in an electronic device. The one or more programs include instructions for allowing the electronic device to execute the methods based on the claims or the embodiments disclosed in the disclosure.

The program (the software module or software) may be stored in a random access memory, a non-volatile memory including a flash memory, a read only memory (ROM), an electrically erasable programmable read only memory (EEPROM), a magnetic disc storage device, a compact disc-ROM (CD-ROM), digital versatile discs (DVDs) or other forms of optical storage devices, and a magnetic cassette. Alternatively, the program may be stored in a memory configured in combination of all or some of these storage media. In addition, the configured memory may be plural in number.

Further, the program may be stored in an attachable storage device capable of accessing the electronic device through a communication network such as the Internet, an Intranet, a local area network (LAN), a wide LAN (WLAN), or a storage area network (SAN) or a communication network configured by combining the networks. The storage device may access via an external port to a device which performs the embodiments of the disclosure. In addition, an additional storage device on a communication network may access to a device which performs the embodiments of the disclosure.

In the above-described specific embodiments of the disclosure, elements included in the disclosure are expressed in singular or plural forms according to specific embodiments. However, singular or plural forms are appropriately selected according to suggested situations for convenience of explanation, and the disclosure is not limited to a single element or plural elements. An element which is expressed in a plural form may be configured in a singular form or an element which is expressed in a singular form may be configured in plural number.

While the disclosure has been shown and described with reference to certain embodiments thereof, it will be understood by those skilled in the art that various changes in form and details may be made therein without departing from the spirit and scope of the disclosure as defined by the appended claims and their equivalents.

What is claimed is:

1. A method performed by a session management function (SMF) in a wireless communication system, the method comprising:
    triggering to update network slice availability;
    transmitting, to a network slice admission control function (NSACF), a first message for network slice availability update request including a user equipment (UE) identifier (ID) and a protocol data unit (PDU) session ID; and
    receiving, from the NSACF, a second message for network slice availability update response including a result indication,
    wherein the UE ID and the PDU session ID are related to a number of PDU sessions per network slice.

2. The method of claim 1, wherein in case that the first message is associated with increasing the number of PDU sessions per network slice:
    in case that the NSACF locates the UE ID, the PDU session ID is stored, and the number of PDU sessions per network slice is increased, or
    in case that the NSACF did not locate the UE ID, an entry for the UE ID is created, the PDU session ID is stored, and the number of PDU sessions per network slice is increased.

3. The method of claim 1, wherein in case that the first message is associated with decreasing the number of PDU sessions per network slice:
    the number of PDU sessions per network slice is decreased, and
    an entry for the UE ID or the PDU session ID is removed.

4. The method of claim 1, further comprising receiving, from a UE, a PDU session establishment request message associated with the UE ID and the PDU session ID.

5. The method of claim 1, further comprising:
    transmitting, to a network repository function (NRF), a third message for NSACF discovery request including information on a required NSACF capability; and
    receiving, from the NRF, a fourth message for NSACF discovery response including information on a selected NSACF.

6. A method performed by a network slice admission control function (NSACF) in a wireless communication system, the method comprising:
    receiving, from a session management function (SMF), a first message for network slice availability update request including a user equipment (UE) identifier (ID) and a protocol data unit (PDU) session ID;
    updating a number of PDU sessions per network slice based on the UE ID and the PDU session ID; and
    transmitting, to the SMF, a second message for network slice availability update response including a result indication,
    wherein whether to update network slice availability is triggered by the SMF.

7. The method of claim 6, wherein in case that the first message is associated with increasing the number of PDU sessions per network slice, updating the number of PDU sessions per network slice comprises:
  in case that the NSACF locates the UE ID:
    storing the PDU session ID, and
    increasing the number of PDU sessions per network slice, or
  in case that the NSACF did not locate the UE ID:
    creating an entry for the UE ID,
    storing the PDU session ID, and
    increasing the number of PDU sessions per network.

8. The method of claim 6, wherein in case that the first message is associated with decreasing the number of PDU sessions per network slice, updating the number of PDU sessions per network slice comprises:
  decreasing the number of PDU sessions per network slice; and
  removing an entry for the UE ID or the PDU session ID.

9. The method of claim 6, wherein a PDU session establishment request message associated with the UE ID and the PDU session ID is transmitted from a UE to the SMF.

10. The method of claim 6, wherein a third message for NSACF discovery request including information on a required NSACF capability is transmitted from the SMF to a network repository function (NRF), and
  wherein a fourth message for NSACF discovery response including information on a selected NSACF is transmitted from the NRF to the SMF.

11. A session management function (SMF), the SMF comprising:
  a transceiver, and
  a controller configured to:
    trigger to update network slice availability,
    transmit, to a network slice admission control function (NSACF), via the transceiver, a first message for network slice availability update request including a user equipment (UE) identifier (ID) and a protocol data unit (PDU) session ID, and
    receive, from the NSACF, via the transceiver, a second message for network slice availability update response including a result indication,
  wherein the UE ID and the PDU session ID are related to a number of PDU sessions per network slice.

12. The SMF of claim 11, wherein in case that the first message is associated with increasing the number of PDU sessions per network slice:
  in case that the NSACF locates the UE ID, the PDU session ID is stored, and the number of PDU sessions per network slice is increased, or
  in case that the NSACF did not locate the UE ID, an entry for the UE ID is created, the PDU session ID is stored, and the number of PDU sessions per network slice is increased.

13. The SMF of claim 11, wherein in case that the first message is associated with decreasing the number of PDU sessions per network slice:
  the number of PDU sessions per network slice is decreased, and
  an entry for the UE ID or the PDU session ID is removed.

14. The SMF of claim 11, wherein the controller is further configured to receive, from a UE, via the transceiver, a PDU session establishment request message associated with the UE ID and the PDU session ID.

15. The SMF of claim 11, wherein the controller is further configured to:
  transmit, to a network repository function (NRF), via the transceiver, a third message for NSACF discovery request including information on a required NSACF capability, and
  receive, from the NRF, via the transceiver, a fourth message for NSACF discovery response including information on a selected NSACF.

16. A network slice admission control function (NSACF), the NSACF comprising:
  a transceiver, and
  a controller configured to:
    receive, from a session management function (SMF), via the transceiver, a first message for network slice availability update request including a user equipment (UE) identifier (ID) and a protocol data unit (PDU) session ID,
    update a number of PDU sessions per network slice based on the UE ID and the PDU session ID, and
    transmit, to the SMF, via the transceiver, a second message for network slice availability update response including a result indication,
  wherein whether to update network slice availability is triggered by the SMF.

17. The NSACF of claim 16, wherein in case that the first message is associated with increasing the number of PDU sessions per network slice, the controller is further configured to:
  in case that the NSACF locates the UE ID:
    store the PDU session ID, and
    increase the number of PDU sessions per network slice, or
  in case that the NSACF did not locate the UE ID:
    create an entry for the UE ID,
    store the PDU session ID, and
    increase the number of PDU sessions per network.

18. The NSACF of claim 16, wherein in case that the first message is associated with decreasing the number of PDU sessions per network slice, the controller is further configured to:
  decrease the number of PDU sessions per network slice, and
  remove an entry for the UE ID or the PDU session ID.

19. The NSACF of claim 16, wherein a PDU session establishment request message associated with the UE ID and the PDU session ID is transmitted from a UE to the SMF.

20. The NSACF of claim 16, wherein a third message for NSACF discovery request including information on a required NSACF capability is transmitted from the SMF to a network repository function (NRF), and
  wherein a fourth message for NSACF discovery response including information on a selected NSACF is transmitted from the NRF to the SMF.

* * * * *